(12) United States Patent
Asher et al.

(10) Patent No.: US 7,320,807 B2
(45) Date of Patent: Jan. 22, 2008

(54) CO-EXTRUDED CHEESE SNACKS

(75) Inventors: Yashavantkumar J. Asher, Williamsville, NY (US); Pierre Nurit, Williamsville, NY (US); Larry R. Pokojski, West Seneca, NY (US); Sebastien Robert, Turlock, CA (US); Jean F. Falcetta, East Amherst, NY (US)

(73) Assignee: Sorrento Lactalis, Inc., Buffalo, NY (US)

( * ) Notice: Subject to any disclaimer, the term of this patent is extended or adjusted under 35 U.S.C. 154(b) by 0 days.

(21) Appl. No.: 09/834,253

(22) Filed: Apr. 12, 2001

(65) Prior Publication Data

US 2002/0150654 A1    Oct. 17, 2002

(51) Int. Cl.
*A23C 19/00*    (2006.01)

(52) U.S. Cl. .................. 426/89; 426/516; 426/573; 426/582

(58) Field of Classification Search ............ 426/89, 426/516, 573, 575, 580, 582, 661, 548, 549, 426/658
See application file for complete search history.

(56) References Cited

U.S. PATENT DOCUMENTS

| | | | | |
|---|---|---|---|---|
| 4,482,575 A | * | 11/1984 | Olds | 426/582 |
| 4,612,198 A | | 9/1986 | Wallin et al. | |
| 5,194,283 A | * | 3/1993 | Dupas et al. | 426/582 |
| 5,709,900 A | * | 1/1998 | Miller et al. | 426/582 |
| 5,807,601 A | * | 9/1998 | Carpenter et al. | 426/578 |
| 6,113,953 A | * | 9/2000 | McMahon et al. | 426/36 |
| 6,312,746 B2 | * | 11/2001 | Paluch | 426/282 |
| 6,632,466 B2 | * | 10/2003 | Roussel et al. | 426/516 |

* cited by examiner

*Primary Examiner*—Leslie Wong
(74) *Attorney, Agent, or Firm*—Phillips Lytle LLP

(57) ABSTRACT

A cheese snack (10) includes an extruded annular cheese product (12) and a flavoring core (11) co-extruded within the cheese product. The core is normally flowable at room temperature. The product and core have substantially planar end faces with the core being exposed at the end faces. The cheese snack is processed such that the core does not substantially flow out of the cheese product prior to consumption when the product is stored at room temperature.

29 Claims, 1 Drawing Sheet

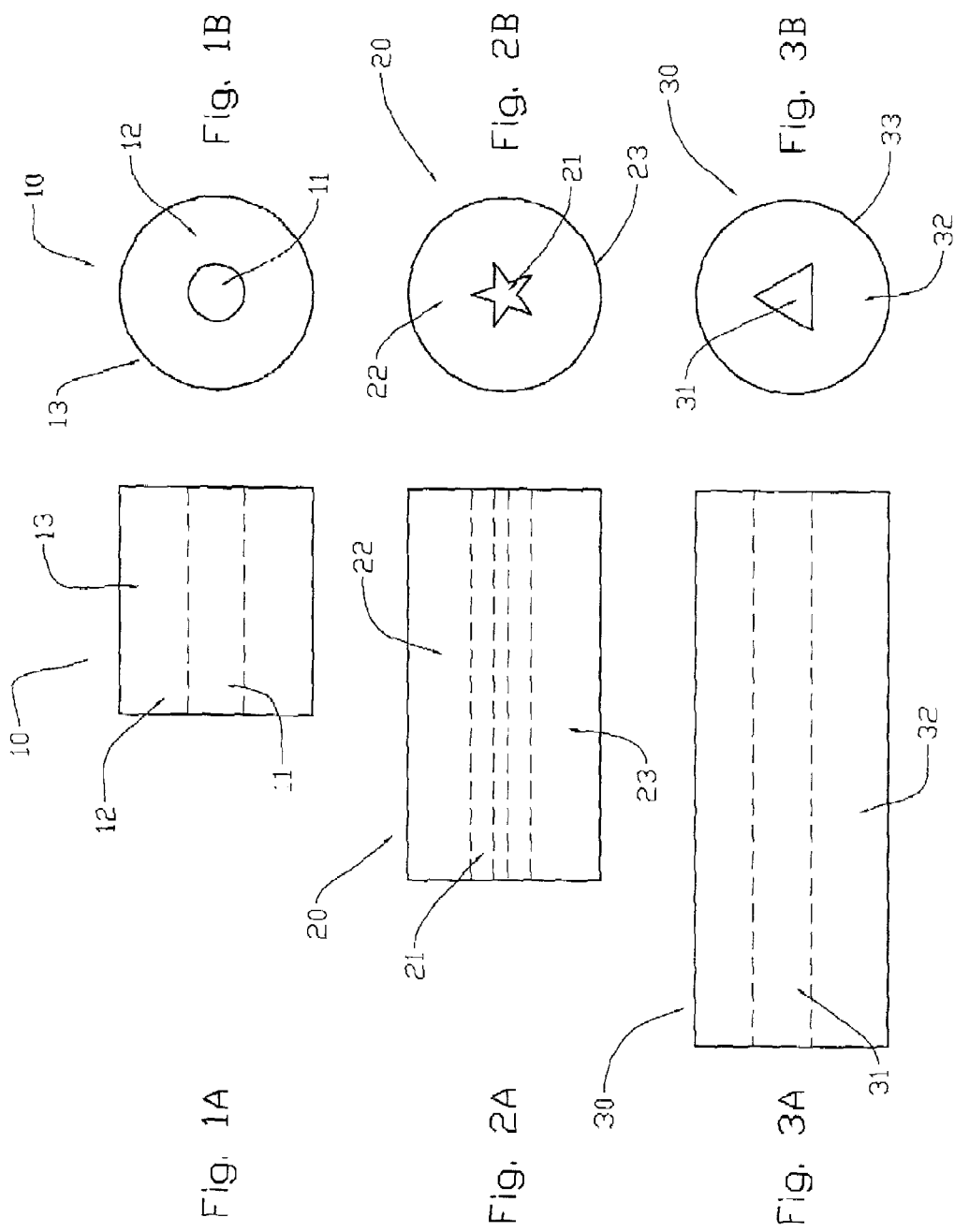

CO-EXTRUDED CHEESE SNACKS

TECHNICAL FIELD

The present invention relates generally to extruded food products, and, more particularly, to improved cheese snacks in which an inner flavoring core is co-extruded with an outer annular cheese product.

BACKGROUND OF THE INVENTION

This invention relates to the manufacture of edible cheese snacks having components of different properties (e.g., taste, texture, comestibility, color, etc.).

Various techniques for manufacturing string cheeses and cheese pieces have been in commercial use for several years. For example, U.S. Pat. Nos. 4,738,863 and 4,850,837 disclose methods and apparatuses for the extrusion of cheese pieces. Both of these patents appear to be directed toward processes for molding and chilling cheese.

The extrusion of molten cheese masses in form of ropes or strings has also been used commercially in the manufacture of string cheese. For example, U.S. Pat. No. 4,392,801 describes the apparatus that can be used to manufacture cheese rope. Downstream rollers are operated at higher surface speeds to pull the rope from an extrusion die. U.S. Pat. No. 4,902,523 discloses a method and apparatus that can be used to extrude cheese into multiple ropes. Each of the devices and apparatuses disclosed in these patents produce cheese pieces, and, in most cases, string cheese having only one type of cheese product.

U.S. Pat. No. 5,792,497 is directed toward a process and equipment for the production of twisted string cheeses. Here, two cheeses are severally melted, and these molten masses are combined in the extrusion head to provide woven string of the two different cheese types.

U.S. Pat. No. 3,480,445 discloses cereal-encapsulated products having cheese in the center. U.S. Pat. No. 4,659,580 discloses a method and apparatus for the extrusion of food product having a cheese core completely encapsulated within an edible coating, such as a meat base.

Attempts have been made to co-extrude two different types of cheeses into cylindrical shapes. U.S. Pat. No. 5,194,283 discloses a process of co-extruding two different types of unripened cheese at temperatures less than about 30° C. This patent also discloses co-extrusion of fruit and savory preparations in the core. However, these types of core materials were only used when the co-extruded food product could be dispensed in a cup, where the bottom of the cup prevented soft core from leaking out.

While it has been known to co-extrude different cheese products, a problem has persisted when the extruded length of the composite product is cut transversely to form individual bite-sized snacks. Such transverse cutting leaves the snack pieces with two exposed end faces. If the flavoring core is sufficiently fluid, it may actually flow or leak out of the snack at the exposed end faces. This problem is exacerbated if the composite product is not chilled, but is adapted to be stored at room temperature prior to use or consumption.

SUMMARY OF THE INVENTION

This invention overcomes the problem of a relatively-fluid central core leaking out of the exposed end faces of a cheese snack. The technologies heretofore developed are believed to have failed to permit the use of softer more-fluid core materials, without leakage of the core material from the exposed end face(s) upon transverse cutting or slicing of the composite food product. In the prior art, the probability of core material leakage required that the core be completely encapsulated within an outer layer, or required extrusion of the product in to cup. The present invention permits co-extrusion and transverse cutting or severance of co-extruded masses having softer and more-liquid cores, without leakage of the core material from the exposed end face(s) of the cheese snack during further processing steps, including packaging.

The improved technology also permits extrusion of cheese using a conventional cooker-stretcher where cheese enters the extrusion device at temperatures on the order of 54-60° C., but sometimes as high as 75° C.

The critical parameters to be controlled are the viscoelastic properties of co-extruded cheese molten masses, viscosity of the core and its temperature, the rate of extrusion of both core and the surrounding coating, the line pressure, and the cryogenic freezing of cut pieces. The cryogenic freezing is adjusted as a function of tunnel temperature and rate of hardening. Conventional techniques of rapid hardening will result in uneven freezing of core and coating, and variations in the thermal expansion/contraction of core and surrounding. This can lead to leakage (i.e., "oozing out") of the core material from the exposed end face(s). After packaging, the frozen core will melt, resulting in poor seal and unclean looking edge(s). Such products may not be saleable, and may have poor shelf life due to leaking core materials.

Accordingly, and with parenthetical reference to the corresponding parts, portions or surfaces of the disclosed embodiment, merely for purposes of illustration and not by way of limitation, the present invention provides an improved cheese snack (10) that broadly comprises: an extruded annular cheese product (12), and a flavoring core (11) co-extruded within the cheese product. The core is of relatively low viscosity, and is normally flowable at room temperature. The extruded composite product have substantially planar end faces, with the core material being exposed at the end faces. The cheese snack is processed such that core material will not substantially flow out of the exposed end faces of the sliced product prior to consumption, when the product is stored at room temperature.

The cheese product may be selected from the group consisting of mozzarella, cheddar and Monterey Jack cheeses, and the core may be selected from the group consisting of pizza sauce, salsa, soft cheese, peanut butter and fruit flavoring. While these cheeses and core materials are preferred, the invention contemplates that other cheeses and core materials may also be used.

The core has a normal viscosity of about 100-500 grams when measured by a Texture Profile Analyzer ("TPA") at room temperature before the cheese snack is formed. The core may contain at least one of the group consisting of flavoring, maltodextrine, starch and hydocolloids. In one form, the flavoring core contains up to about 1.5% starch. In another form, the flavoring core contains up to about 3% maltodextrine. The flavoring core may contain pieces of flavoring material. An exterior coating may be provided on the cheese product. The cheese product and flavoring core are frozen for a time sufficient to prevent water in the core from migrating into the cheese product. The flavoring core may contain at least one hydrocolloid in an amount sufficient to prevent the flavoring core from leaking out of the exposed end faces of the cheese product, but to prevent the core from drying out. In one form, the one hydrocolloid is present in an amount equal to about 0.2-0.4% by weight. The hydrocolloid may be selected from the group consisting of guar, locust, xanthan, agar and carrageenan.

Accordingly, the general object of this invention is to provide an improved cheese snack.

Another object is to provide an improved composite cheese snack in which co-extruted flavoring core is formed within an outer annular cheese product such that the flavoring core will not substantially flow out of the exposed end face(s) of the snack when stored at room temperature.

These and other objects and advantages will become apparent from the foregoing and ongoing written specification, the drawings and the appended claims.

BRIEF DESCRIPTION OF THE DRAWINGS

FIG. 1A is a side elevation of a first form of an improved cheese snack.

FIG. 1B is an end elevation of the cheese snack shown in FIG. 1A, this view showing the flavoring core as having a circular transverse cross-section.

FIG. 2A is a side elevation of a second form of an improved cheese snack.

FIG. 2B is an end elevation of the cheese snack shown in FIG. 2A, this view showing the flavoring core as having a star-shaped transverse cross-section.

FIG. 3A is a side elevation of a third form of an improved cheese snack.

FIG. 3B is an end elevation of the cheese snack shown in FIG. 3A, this view showing the flavoring core as having a triangular transverse cross-section.

DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

The present invention is directed toward the production of co-extruded food products, where the coating layer consists of cheese, the core is made up of semi-solid to fairly-fluid food material, and resulting composite product has the capability of being packaged without sealing the exposed end face(s) of the product. However, if desired, one could seal one or both end faces to enhance esthetical appearance of the cheese snack.

Referring now the drawings, three different forms of composite products are disclosed. The first form is shown in FIGS. 1A and 1B, the second in FIGS. 2A and 2B, and the third in FIGS. 3A and 3B. The lengths of the various co-extruded food products, as shown in FIGS. 1A, 2A and 3A, are specifically different to demonstrate that the length of the cheese snack may be varied. For example, it may be a relatively short bite-sized piece, or may be an elongated rod, such as commonly found with string cheese, and so on.

The transverse views, namely, FIGS. 1B, 2B and 3B, illustrate that the flavoring core may have different transverse shapes.

Thus, in FIGS. 1A and 1B, the extruded composite material is generally indicated at 10. This product is shown as having a flavoring core 11 that has a circular transverse shape when seen at an exposed end face. The flavoring core is wholly contained within an outer annular cheese product 12. If desired, the product may have an outermost coating 13, of a flavorant, coloring agent, texturing agent, or the like.

In FIGS. 2A and 2B, the food product is generally indicated at 20. Here, the composite food product has a flavoring core 21 that appears to be somewhat star-shaped when seen in transverse cross-section at the end face. Here again, the flavoring core 21 is contained within outer cheese product 22, and the product may have an outermost coating 23.

In FIG. 3, the composite cheese product is generally indicated at 30. Here again, the flavoring core 31 is still a different shape, and appears to be somewhat triangular when seen in transverse cross-section at the end face. The flavoring core 31 is wholly contained within the outer co-extruded cheese product 32. Again, the product may have an outermost coating at 33. It should also be appreciated that the outer shape or appearance of the cheese product need not necessarily be cylindrical, be may have some other shape as well.

In the inventive process, the curd of natural cheeses, like mozzarella and or cheddar, is transported to a cooker-stretcher, where the curd is heated and kneaded with the aid of warm water and twin screws. The movement of the rotating screws and warm water convert the curd into a molten mass, which is further kneaded and stretched, resulting in the formation of fibrous plastic mass. At this stage, the molten mass is typically at a temperature of 54-60° C. At these temperatures, the milk fat is in a liquid state, and molten mass is plastic in nature. Hence, it has a tendency to lose shape, to collapse into a hollow space, and to shrink upon cooling. The molten mass is carried into an extrusion head with the help of two augers.

The extrusion head is rather complex. It has to perform several tasks simultaneously. The extrusion head is mounted on a housing. The housing supports a hopper, and has twin augers, the speed of which is controlled by a variable-speed hydraulic motor. The twin screws force the molten mass into the extrusion head. Part of housing containing the twin screws is jacketed, and warm water is circulated through the jacket to keep molten mass pliable. The cylindrical extrusion head has a dual jacket with a cone in the center. The sharp edge of this cone faces the molten mass and regulates the flow of molten mass to each of the extrusion nozzles.

The extrusion head jacket located closer to the point of molten mass entry has circulating water at a temperature of about 73° C. Depending upon the operating parameters and thermo-mechanical properties of the outer coating, the water temperature can be adjusted upwardly or downwardly, as needed, with the aid of a suitable heat exchanger. The portion of the extrusion head jacket located toward the brine (i.e., toward the exit end of the extrusion head) is circulated with cooling water at a temperature of about 4° C. Again, this temperature can be adjusted upwardly or downwardly, as desired, with the help of a second heat exchanger.

Each of the extrusion nozzles includes two concentric tubes. The outer tube conveys a suitable cheese product. The inner tube, which is slightly shorter in length than the outer tube, conveys the flavoring core food material, such as pizza sauce, salsa, soft cheese, peanut butter, fruit flavoring, or the like. The exit end of the extrusion head is cooled with chilled water or brine to cool the outer surface of the composite food material.

The extrusion head is submerged in chilled brine. This is done to minimize the gravitational force on the co-extruded stings. These strings are carried longitudinally on a conveyer belt while submerged in brine. The belt rises at an angle of about 25-30 degrees, and is operated at a greater-than-extrusion speed to pull strings away from the extrusion head. The brine is maintained at a temperature of about 0-5° C. The chilled extruded co-extruded strings are transversely cut or sliced to obtain desired or size of cheese snack. At this stage, the core material is still at a temperature of about 4-20° C.

Depending upon the desired level of viscosity, the core food material is thickened with the help of conventional food grade starches, maltodextrins and hydrocolloids. The individual formulations vary with the particular foodstuff added to the core material.

The secondary purpose of stabilizing the core material is directed to managing water migration between core and outer coating. Each of the components (i.e., core and coating foodstuffs) has unique functional and organoleptic properties. Therefore, it is critical to minimize migration of water and other solutes therebetween. To meet commercial requirements, products have to remain acceptable, judging by organoleptically and microbiological standards, for up to 120 days at storage temperatures of up to about 7° C. The coating, consisting of natural cheeses like cheddar and mozzarella, contains viable culture. Thus, their physico-chemical properties will continue to change during refrigerated storage. The core is heat treated with a stabilizing agent to initiate activation and hydration of stabilizing agents.

The freezing profile, energy-required-to-freeze, heat transfer and expansion/contraction coefficients of both core and coating materials are significantly different. To prevent the leakage of the low viscosity fluid core upon transverse cutting, the co-extruted strings should be cooled to a sub-zero temperature in few seconds. The freezing process also has to be rapid to prevent the formation of large ice crystals. The slow formation of large ice crystals could have harmful impact on the texture and appearance of core and coating. On the other hand, such rapid cooling to sub-zero temperatures could lead to serious deformation problems associated with the difference in the coefficients of thermal expansion between the core and coating. This problem is compounded by differences in the rate of cooling for outer and inner surfaces. Extreme rapid cooling below sub-zero temperatures can cause shrinkage of outer coating, which results in contraction of cross-section of the core. Being less viscous and unfrozen, the core material may be forced out (e.g., "squeezed") at both end faces. Once exposed to atmosphere, the core freezes rapidly. This may create an unusual product in which the core appears as a spindle on which the outer coat is wound.

The freezing profile of coating and core food stuff can be determined by means of a Differential Scanning Calorimeter ("DSC") and Thermo-Mechanical Analyzer ("TMA").

Modifications

The present invention contemplates that many changes and modifications may be made. For example, the cheese product is not necessarily limited to mozzarella, cheddar or Monterey Jack. Similarly, the flavoring core is not limited to pizza sauce, salsa, soft cheese, peanut butter or fruit flavoring. As previously mentioned, the shape and configuration of the cheese snack, both as to length and transverse appearance and cross-section, may be readily changed or modified. Therefore, while three preferred forms of the improved cheese snack have been shown and described, and several modifications thereof discussed, persons skilled in this art will readily appreciate that various additional changes and modifications may be made without departing from the spirit of the invention, as defined and differentiated by the following claims.

What is claimed is:

1. A cheese snack, comprising:
   an extruded annular natural cheese product;
   a flavoring core co-extruded within said natural cheese product, said core being normally flowable at room temperature, said product and core having substantially planar end faces with said core being exposed at said end faces; and
   wherein said core does not substantially flow out of said natural cheese product during processing of said cheese snack prior to consumption.

2. A cheese snack as set forth in claim 1 wherein said natural cheese product is selected from the group consisting of mozzarella, cheddar and Monterey Jack cheese.

3. A cheese snack as set forth in claim 1 wherein said core is selected from the group consisting of pizza sauce, salsa, soft cheese, peanut butter and fruit flavoring.

4. A cheese snack as set forth in claim 1 wherein said core has a normal viscosity of about 100-500 grams when measured by a Texture Profile Analyzer at room temperature before said cheese snack is formed.

5. A cheese snack as set forth in claim 1 wherein said flavoring core contains at least one of the group consisting of flavoring, maltodextrine, starch and hydocolloids.

6. A cheese snack as set forth in claim 5 wherein said flavoring core contains up to about 1.5% starch.

7. A cheese snack as set forth in claim 5 wherein said flavoring core contains up to about 3% maltodextrine.

8. A cheese snack as set forth in claim 5 wherein said flavoring core contains pieces of flavoring material.

9. A cheese snack as set forth in claim 1 and further comprising an exterior coating on said cheese product.

10. A cheese snack as set forth in claim 1 wherein said cheese product and flavoring core are frozen for a time sufficient to prevent water in said core from migrating into said cheese product.

11. A cheese snack as set forth in claim 1 wherein said flavoring core contains at least one hydrocolloid in an amount sufficient to prevent said flavoring core from leaking out of said cheese product but to prevent said core from drying out.

12. A cheese snack as set forth in claim 11 wherein said one hydrocolloid is present in an amount equal to about 0.2-0.4% by weight.

13. A cheese snack as set forth in claim 11 wherein said hydrocolloid is selected from the group consisting of guar, locust, xanthan, agar and carrageenan.

14. A cheese snack as set forth in claim 1 wherein said flavoring core consists of non-cheese substances.

15. A cheese snack as set forth in claim 1 wherein said cheese snack has a normal processing temperature.

16. A cheese snack, comprising:
   an extruded annular natural cheese product;
   a flavoring core co-extruded within said natural cheese product, said core containing water and being normally flowable at room temperature, said product and core having substantially planar end faces with said core being exposed at said end faces; and wherein said water does not migrate from said core to said natural cheese product during shipping of said cheese snack.

17. A cheese snack as set forth in claim 16 wherein said natural cheese product is selected from the group consisting of mozzarella, cheddar and Monterey Jack cheese.

18. A cheese snack as set forth in claim 16 wherein said core is selected from the group consisting of pizza sauce, salsa, soft cheese, peanut butter and fruit flavoring.

19. A cheese snack as set forth in claim 16 wherein said core has a normal viscosity of about 100-500 grams when measured by a Texture Profile Analyzer at room temperature before said cheese snack is formed.

20. A cheese snack as set forth in claim 16 wherein said flavoring core contains at least one of the group consisting of flavoring, maltodextrine, starch and hydocolloids.

21. A cheese snack as set forth in claim 20 wherein said flavoring core contains up to about 1.5% starch.

22. A cheese snack as set forth in claim 20 wherein said flavoring core contains up to about 3% maltodextrine.

23. A cheese snack as set forth in claim 20 wherein said flavoring core contains pieces of flavoring material.

24. A cheese snack as set forth in claim 16 and further comprising an exterior coating on said cheese product.

25. A cheese snack as set forth in claim 16 wherein said flavoring core contains at least one hydrocolloid in an amount sufficient to prevent said flavoring core from leaking out of said cheese product but to prevent said core from drying out.

26. A cheese snack as set forth in claim 25 wherein said one hydrocolloid is present in an amount equal to about 0.2-0.4% by weight.

27. A cheese snack as set forth in claim 25 wherein said hydrocolloid is selected from the group consisting of guar, locust, xanthan, agar and carrageenan.

28. A cheese snack as set forth in claim 16 wherein said flavoring core consists of non-cheese substances.

29. A cheese snack as set forth in claim 16 wherein said cheese snack has a normal processing temperature.

* * * * *